April 23, 1968   C. E. ANDERSON   3,379,404
CONTROL SYSTEM
Filed Sept. 18, 1964   2 Sheets-Sheet 1
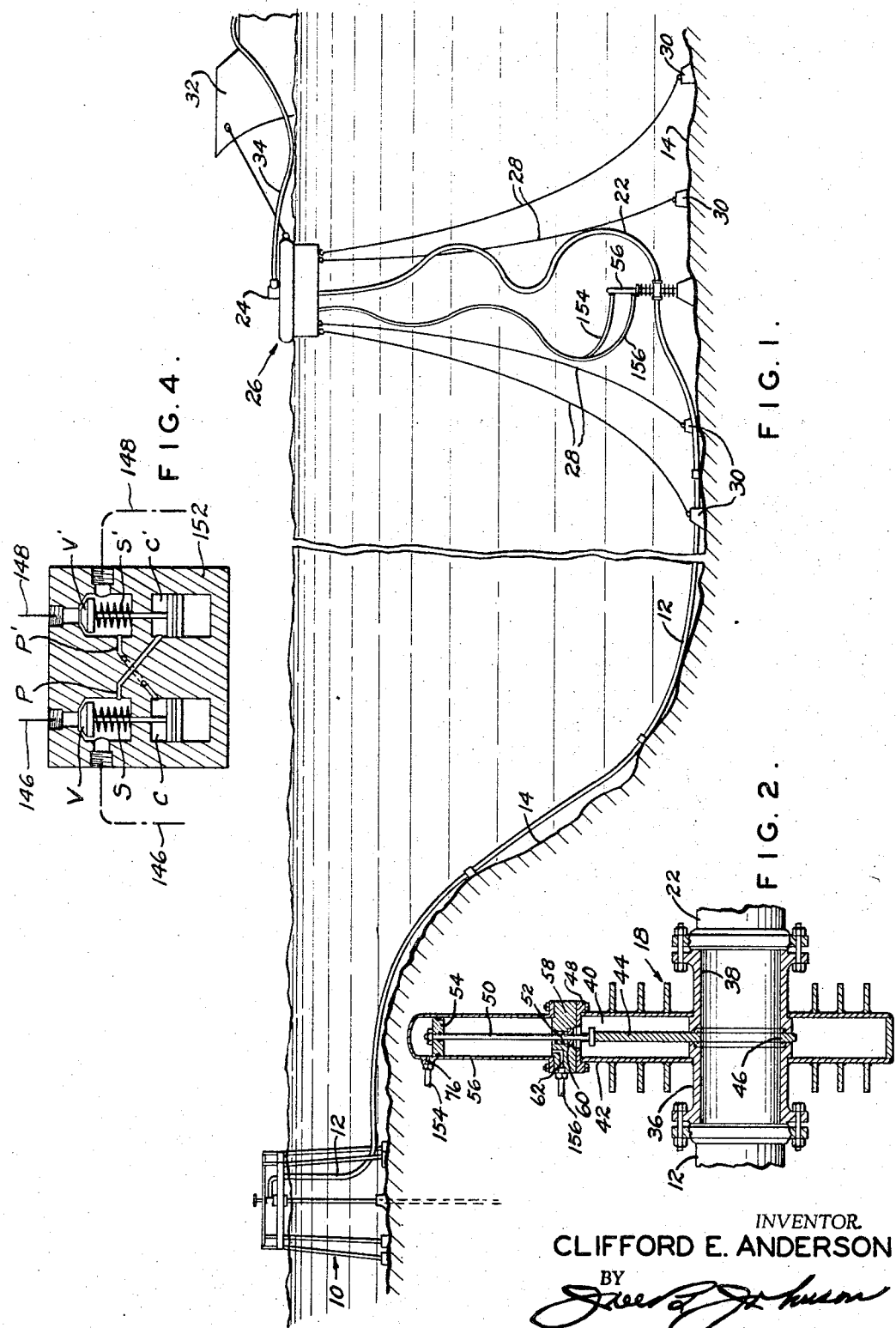
INVENTOR.
CLIFFORD E. ANDERSON
BY
AGENT April 23, 1968 C. E. ANDERSON 3,379,404
CONTROL SYSTEM
Filed Sept. 18, 1964 2 Sheets-Sheet 2
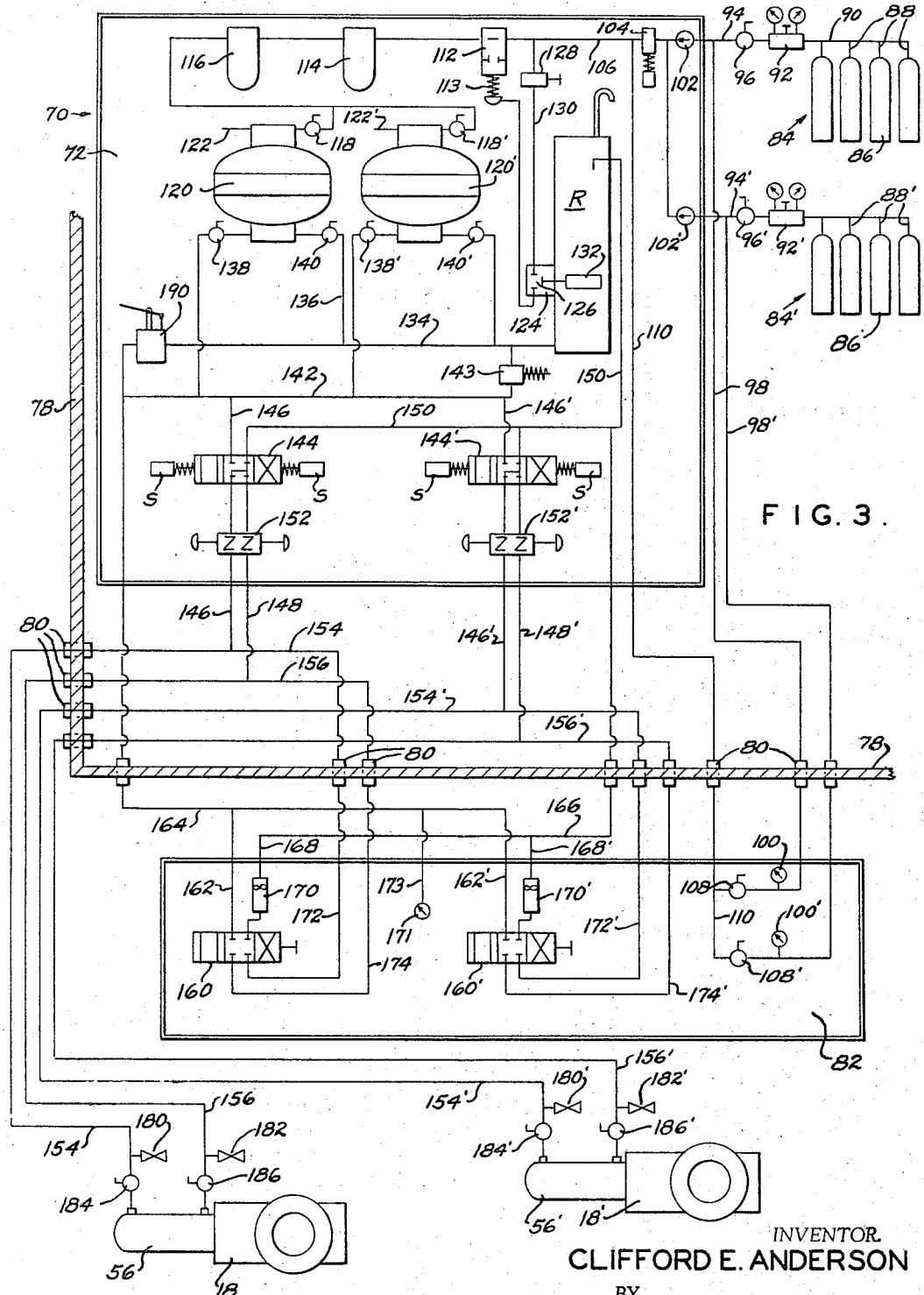
FIG. 3.
INVENTOR.
CLIFFORD E. ANDERSON
BY
AGENT 3,379,404
CONTROL SYSTEM
Clifford E. Anderson, Houston, Tex., assignor to ACF Industries, Incorporated, New York, N.Y., a corporation of New Jersey
Filed Sept. 18, 1964, Ser. No. 397,461
5 Claims. (Cl. 251—26)

This invention relates to apparatus for offshore loading and unloading of ships and particularly to such apparatus for loading and unloading fluids, such as hydrocarbons, gasolines, crude oil and the like.

Ships carrying fluids, such as oil tankers, commonly have drafts of fifty to seventy-five feet or more today and in order to obviate the construction of onshore permanent loading terminals and dredging a channel to the terminals, tanker ships are frequently loaded and unloaded offshore where the water depth is sufficient to allow the passage of a fully loaded tanker. Usually when ships are loaded and unloaded offshore, they are moored to an offshore loading terminal positioned above the water surface on which valves are located for controlling the flow of fluids to and from the ships. The open sea loading and unloading of tankers usually consists of a pipeline or pipelines which are extended along the seabed from a convenient onshore position to an open sea position where ships can navigate and which is sufficiently deep for clearance requirements. At the open sea position, the pipeline extends upwardly to a loading terminal on which valves are arranged to control the flow of fluids. A flexible loading hose, connected or otherwise fixed at one end thereof to each of the valves, extends between the valve and the tanker for transporting fluid from the pipeline to the tanker vessel. In this manner, land based docks and loading lines are completely eliminated as well as the provision of a slip for the ship and dredging problems associated with the slip, and problems involved in providing a reasonably quiet berth for the ship while loading or unloading.

Offshore loading and unloading of tanker vessels is becoming increasingly popular as tanker vessels of very large size and capacity are being developed. Existing ports and harbors are often not sufficiently large or sufficiently deep to accommodate vessels of such size and it is not always economical to reconstruct such harbors or to dredge them to accommodate such vessels. Offshore loading of vessels also lends itself to areas of the world where harbor and docking facilities are not available.

It is accordingly an object of the invention to provide apparatus for loading and unloading fluids from ships which is controlled by a control mechanism located on the loading facility for controlling the flow of fluid through the pipeline.

It is an object of this invention to provide a novel offshore loading facility, the control structure of which includes a self-contained power source.

A further object of this invention contemplates the provision of a novel offshore loading facility which is adapted for manual control or for remote controlled operation.

It is an even further object of this invention to provide a novel offshore loading facility which is adapted to provide for manual control of submerged pipeline valves in the event of failure of the power source of the facility.

Briefly described, the invention comprises apparatus for controlling the offshore loading and unloading of ships with fluids. The invention is incorporated into a loading facility having a pipeline or pipelines extending from shore along the seabed to a position at a sufficient distance from the shore or from the source of fluid where the water depth is adequate to provide sufficient clearance for the draft of relatively large ships. A valve in each of the pipelines is positioned on the seabed generally adjacent the end of the pipeline and in an area generally beneath the ship to be loaded or unloaded for controlling the flow of fluid through the pipeline. A flexible hose is connected at one end thereof to the discharge side of the valve and extends upwardly to a floating loading facility buoy and is connected to pipe structure permanently fixed to the buoy. A ship, which is moored to the buoy and which serves as a floating storage facility, is in fluid communication with the pipe structure on the buoy through a flexible hose. A valve control system, in accordance with the invention, is located in the buoy and is operative either remotely or manually to control position of the undersea valves and thereby to control the flow of fluid through the submerged pipeline to the storage vessel. Other objects and features of this invention will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated;

FIGURE 1 is a schematic view of the present invention indicating apparatus for offshore loading and unloading of ships with fluids;

FIGURE 2 is a sectional view of the sea valve employed in the apparatus shown in FIGURE 1 and located on the seabed in an area generally beneath the ship to be loaded and unloaded; and FIGURE 3 is a schematic view of an onshore control unit for controlling the flow of fluids through the pipeline and sea valve on the seabed.

FIGURE 4 is a sectional view of a double acting check valve employed in the invention.

Corresponding reference characters indicate corresponding parts throughout the several views of the drawings.

Referring to FIGURE 1, an offshore oil well indicated at 10 includes a wellhead assembly generally referred to as a "Christmas tree" mounted on a platform above the surface of the ocean. A discharge line 12 from the wellhead assembly, or group of wellhead assemblies as the case may be, extends along the ocean floor to a position where the depth of the sea is, for example, at least 80 feet deep to permit oil tankers having deep drafts to load and unload. Pipeline 12, for example, may be 30 inches in diameter and may extend 3,000 feet or more in order for the water to reach such a depth.

Communicating with the pipeline 12 is a valve indicated generally at 18 for controlling the flow of fluids through pipeline 12. FIGURE 1 shows only a single valve 18 connected to the pipeline 12. However, it is to be understood that multiple valve controlled submerged pipelines might effectively be employed or a single pipeline might be connected to a header from which several valve controlled branch lines may conduct fluid without altering the spirit or scope of this invention.

Large flexible hoses 22 of sufficient length to extend above the surface of the ocean are connected at one end to the discharge side of each of the undersea valves 18 and connected at their upper end to a swivel line connection 24 located on a floating mooring buoy 26. The mooring buoy 26 is provided with a series of anchoring cables 28 which are connected to anchoring devices 30 positioned on the ocean floor. A storage tanker vessel 32 which may be anchored to the mooring buoy 26 is in fluid communication with the flexible hose 22 through a flexible hose 34 connected between the vessel and the swivel conduit 24. The fluid from the well 10 will, therefore, flow from the pipeline 12 through the valve 18, through the flexible hose 22 to the swivel connection 24, and then through the flexible hose 34 to the vessel 32. The fluid from the well 10 will be stored in the storage vessel 32 until such time as a second vessel may be moored along side of the storage vessel 32 to take on the fluid. The storage vessel 32, therefore, will always remain anchored to the mooring buoy 26 and will serve merely as a transfer point for fluid. This arrangement effectively promotes rapid loading from one vessel to the other without the provision of an excessive number of pipelines or excessive pipeline diameter which might otherwise be provided for rapid loading and unloading.

Referring now to FIGURE 2, each of the valves 18 is of the gate valve type and has a main casing or housing 36 forming a fluid passage 38 therethrough. Mounted in the gate chamber 40 formed by a sheet metal housing 42 about the casing 36 is a reciprocating slab gate 44, comprising a substantially flat metal plate having a passage 46 adapted to register with passage 38 when the gate 44 is open to permit an uninterrupted flow of fluid therethrough. When the valve 18 is closed, gate 44 extends across the passage 38 and blocks the fluid flow through the passage 30. A bonnet or head 48 forms an upper closure for the valve chamber 40. For raising and lowering the gate 44, a valve stem 50 extends through a sealed passage 52 in the bonnet plate 48 and is connected to the gate 44. Secured adjacent the upper end of the stem 50, opposite the gate 44, is a piston 54 mounted for reciprocation within a hydraulic cylinder 56. An adapter plate 58 is formed with a bolt circle for receiving the lower end of the cylinder 56 in sealed relation thereto. The adapter plate 58 is formed with a packing chamber 60 which serves to prevent leakage of fluid between the valve and the hydraulic cylinder 56. The adapter plate 58 is also formed with a hydraulic fluid passage 62.

The valve construction set forth herein is given as merely for purpose of illustration and should not be deemed to limit the scope of this invention. Obviously other types of valves could be effectively employed without departing from the spirit or scope of this invention.

For controlling the operation of the valve 18 at a location remote from the valve and forming an important feature of this invention, control apparatus designated generally 70 is positioned within the buoy 26 in such a manner as to be protected from damage by seawater. A pair of pressure lines 156 and 154 are connected to the piston operator structure and respectively communicate with the fluid passage 62 in the adapter plate 58 and the port 76 at the upper portion of the cylinder 56. The pressure lines 154 and 156 are flexible and extend from the power operator cylinder 56 upwardly to the buoy 26, as illustrated generally in FIGURE 3. A control support plate 72, on which is mounted several elements of the flow control structure, to be described hereinafter, is positioned within the interior of a watertight compartment in the buoy 26. As illustrated in FIGURE 3, a bulkhead or wall structure 78 of the watertight compartment is provided with a series of tubing bulkhead unions 80, which allow the conduit structures of the control system to pass through the bulkhead 78, while maintaining the compartment in a watertight condition. A control panel 82 is fixed to the exterior portion of the buoy 26 in such a manner that the control system can be monitored and manually controlled without the necessity of gaining access to the watertight compartment.

For providing power for the control system, two banks 84 and 84' of gas tanks are provided which might contain compressed air or any other suitable compressed gas. Each of the banks 84 and 84' include several small tanks 86, such as the type commonly called scuba tanks, which may be easily removed for refilling. Each of the gas tanks 86 is connected through conduits 88 to a manifold 90. Each of the banks of gas tanks 84 and 84' are controlled respectively by a pressure regulator 92 and 92' to maintain the pressure within main control lines 94 and 94' within a predetermined pressure range. Each of the banks of gas tanks is controlled by a manually operated ball valve 96 and 96' for selectively or simultaneously utilizing the banks to control the system. Each of the main lines 94 and 94' from the compressed gas supply banks, is connected through conduits 98 and 98' respectively, which extend through the bulkhead 78 and communicate the pressure from the selected bank to pressure gauges 100 and 100' on the control panel 82, so that the gas pressure within the system can be visually monitored at all times without the necessity of entering the watertight compartment. For controlling the flow of gas into the system, a solenoid actuated two-way valve 104 is positioned in a conduit 106 which communicates with the main lines 94–94'. The solenoid energized valve 104 is adapted for remote or radio control from the storage vessel 32 for movement of the same between open and closed positions to control operation of the system.

The solenoid energized valve 104 and various other radio controlled valve structures employed in the control system of this invention, are adapted for remote radio control by commercially available radio control apparatus, not illustrated in the drawings. It is obvious, however, that other types of remote control apparatus could be successfully employed without altering the spirit or scope of this invention.

The selected gas supply source may be manually communicated with the conduit 106 by opening either one of a pair of ball valves 108 and 108', which are positioned on the control panel and are connected respectively in the conduits 98 and 98'. The conduits 98 and 98' are each connected to a single bypass conduit 110, which is connected at one end thereof to the conduit 106 downstream of the solenoid actuated valve 104. It is to be understood, therefore, that each of the gas sources 84 and 84' may be selectively communicated with the main gas conduit 106 by remote radio control by actuation of the control valve 104 from the storage vessel 32 or by manual control by moving either of the manually actuated ball valves 108 or 108' to the open position to allow flow of gas through the conduit 110.

A pressure actuated two-way valve 112 is disposed in the conduit 106 and is automatically movable between open and closed positions in a manner to be discussed hereinbelow to control the flow of compressed gas through the conduit 106. A liquid trap 114 and a gas lubricator 116 are positioned in the conduit 106 for the purpose of removing any liquid from the compressed gas and for proper lubrication of the gas prior to its use in the system. The gas after passing through the lubricator 116 is directed under selective control by a pair of ball valves 118 and 118' to the gas side of a pair of gas driven hydraulic pumps 120 and 120'. The gas, after being utilized to drive the hydraulic pumps, will be vented to the atmosphere through vent conduits 122 and 122'.

The hydraulic fluid reservoir R, which is mounted on the support plate 72, is provided with a low fluid level actuating structure 124, which is energized, if the fluid level within the reservoir R should drop to a predetermined low level, to open a valve 126 to communicate gas under pressure to a gas controlled two-way valve 112.

The valve 112 is adapted for movement from its open to its closed position by gas under a predetermined pressure controlled by a pressure regulator 128 in a conduit 130 leading from the conduit 106 to the fluid level actuated structure 124. A float 132, which is positioned within the reservoir R at a selected position above the bottom of the reservoir, will move downwardly under the influence of gravity when the liquid level drops to a predetermined position within the reservoir R to cause the valve 126 to move to its open position, thereby allowing the flow of gas to the valve 112. A spring 113 is adapted to return the valve 112 to its open position upon closing of the valve 126. It is to be understood, therefore, that the flow of gas through conduit 106 to the gas actuatd motors 120 and 120' is controlled responsive to the level within the reservoir R. This serves as a safety factor to prevent actuation of the control system if there is insufficient hydraulic fluid within the fluid reservoir R. The fluid level actuating structure 124 and the gas operated flow control valve 112 may be any one of various suitable commercially available structures without departing from the spirit or scope of this invention.

A manifold conduit 134 is communicated with the reservoir R at the lower end thereof and serves to transmit fluid through a pair of branch conduits 136 and 136' to the motors 120 and 120' respectively. The gas-hydraulic motors 120 and 120' may operate simultaneously or individually as selected by the operator. A series of ball valves 138 and 140 and 138' and 140' are positioned within the flow circuit 136 and 136' to selectively control energization of the hydraulic motors 120 and 120' as desired, and to provide for maintenance of the system without the necessity of shutting down the system entirely. Hydraulic fluid under pressure developed by the gas-hydraulic motors 120 and 120' flows out of the discharge side of the gas-hydraulic motors into a header conduit 142.

For actuation of the control structure by remote control or radio control from the storage vessel 32, a pair of three-way solenoid energized valves 144 and 144' are communicated through inlet lines 146 and 146' to the header conduit 142.

Each of the control valves 144 and 144' are connected to a vent conduit 150 for transporting of fluid vented from the valves to the reservoir R. Pilot operated check valves 152 and 152', which are positioned respectively in lines 146–148 and 146'–148', serve to prevent undesired movement of the piston operator of the valves 18–18'. Each of the check valves 152 and 152' may be any one of various commercially available pilot operated double check valves. For the purpose of explanation, a pilot operated duoble check valve of the type employed in the invention is illustrated in FIGURE 4. Assuming that the discharge lines of the pumps 120 are in communication with the pressure line 146, hydraulic fluid will overcome the spring S of the valve V forcing the valve V from its seat and allowing hydraulic fluid to flow into the pressure line 146 downstream from the valve. Hydraulic fluid under pressure will flow through a passage P from the inlet of pressure line 146 to a cylinder C' causing the valve V' to be displaced from its seat and allowing the flow of hydraulic fluid from the piston operator 56 through the pressure line 148 and through the return line 150 to the reservoir R. Assuming now that the three-way valve 144 is moved to the left, thereby reversing the flow of hydraulic fluid in the lines 146 and 148, the valve 152 would automatically be reversed. Pressurized hydraulic fluid from the line 148 would overcome the spring S' of the valve V', thereby unseating the valve V' and allowing the flow of fluid through the valve 152 to the innermost chamber of the piston operator 56. At the same time the valve V would be unseated by hydraulic fluid entering the cylinder C through the passage P' from the inlet of the line 148, thereby permitting the flow of hydraulic fluid through the line 146 to the return line 150 of the reservoir R. Upon depressurizing the control system, the valves V and V' of the double check valve 152 will both be moved by their respective springs S and S' to the closed position, blocking any further flow of fluid from either of the two chambers of the piston operator 56. This effectively prevents any tendency of the piston operator to inadvertently move from its selected position. For example, viewing FIGURE 2, assuming that the valve 18 is in its closed position with the piston 54 in its lowermost position, leakage of fluid from the valve chamber 40 through the stem packing assembly 60 and into the piston operator could cause movement of the piston outwardly thereby causing the valve member 44 to move inadvertently toward its open position. Since the pilot operated double check valve 152–152' effectively prevents the flow of fluid in the pressure lines 154 and 156, the piston will not be allowed to move and the valve 18 will remain closed. The hydraulic conduits 146 and 148 are connected respectively to pressure control conduits 154 and 156, which communicate with the piston operator 56 of the valve 18. The hydraulic conduits 146' and 148' are respectively connected to the pressure control conduits 154' and 156' for energization of the hydraulic operator 56' of the valve 18'.

For actuation of the pipeline valves 18 and 18' by manual control, a pair of manually operated three-way control valves 160 and 160' are communicated through inlet conduits 162 and 162' and through a conduit 164 to the header or manifold conduit 142. A pressure gauge 171 is communicated through a conduit 173 to the conduit 164 to indicate the pressure required to operate the fluid motor operator 56–56' to open or close the valves 18–18'. The condition of the valve may also be determined by observing changes in the fluid pressure required to operate the valve. A return conduit 166 is connected at one end thereof to the return conduit 150 and communicates at the other end thereof with conduits 168 and 168' respectively of the valves 160–160' to vent fluid from the valves 160 and 160' to the reservoir R. Each of the conduits 168 and 168' is provided with a visual flow indicating device 170–170', which gives visual indication of fluid flowing through the conduits 168–168' to the reservoir R. By observing the visual flow indicating devices 170 and 170', the operator can determine movement of the piston operator of the valve 18 and 18' as an indication that the valve member 44 is moving between open and closed positions. Also by observing stopping of movement in the visual flow indicators 170–170', by measuring the amount of fluid which flows or by measuring the length of time required for a cycle of operation, the operator can determine movement of the valve members to the fully open or fully closed position. A pair of conduits 172 and 174 connect the control valve 160 with the pressure control conduits 154 and 156 of the hydraulic operator 156. Likewise the manual control valve 160' is connected through a pair of conduits 172' and 174' respectively to the pressure control conduits 154' and 156' for energization of the piston of the hydraulic operator 56'. Each of the pilot control lines 154, 156, 154' and 156' is provided with a needle valve structure respectively 180, 182, 180' and 182', which serve to vent fluid from the pressure control lines to the medium surrounding the valve for bleeding air or gas from the pressure control lines and for servicing of the piston operators as desired. A small ball valve 184–186, 184' and 186' is positioned in each of the pressure control lines between the needle valve and the piston operator for servicing of the hydraulic system as desired.

For operation of the valves 18 and 18' in the event of power failure rendering the motors 120 and 120' inoperative, a hydraulic handpump 190, having its inlet connected through the conduit 134 to the reservoir R and its outlet connected to the conduit 164, is provided for manual pressurization of the hydraulic fluid. The hydraulic handpump 190 has its discharge side also connected to the manifold 142 to which the inlet conduits 146 and 146' respectively of the radio controlled solenoid valves 144 and 144' are connected, thereby allowing the valves 18 and 18' to be operated through either the radio controlled three-way valves 144–144' or the manually controlled three-way valves 160–160'.

For operating the valves 18 and 18' by remote control from the vessel 32, the radio controlled two-way valve 104 is moved to its open position, allowing the flow of compressed air from either or both of the banks 84–84' of compressed air into the conduit 106. Assuming that the level of fluid in the reservoir R is above a predetermined lowermost position, the compressed air will flow through the two-way valve 112, the liquid trap 114, and the air lubricator 116 to the inlet side of the air driven hydraulic pumps 120 and 120'. After driving the pumps, the air is exhausted to the atmosphere through the discharge conduits 122 and 122' respectively of the hydraulic pumps 120 and 120'. Hydraulic fluid is drawn through the suction conduits 136 and 136' respectively of the pumps 120 and 120' from the conduit 134 and, after being compressed by the pumps 120 and 120', is forced into the manifold 142 under pressure. A predetermined maximum pressure within the manifold 142 is maintained by a relief valve 143, which is connected between the manifold 142 and the conduit 134, and serves to vent hydraulic fluid from the discharge side of the pump into the reservoir R upon the buildup of excessive pressure, to prevent rupture of or damage to the hydraulic lines or the piston operator 56. As viewed in FIGURE 3, the control valves 144 and 144' will be moved to the right by the solenoids S in response to radio control from the vessel 32, allowing the fluid under pressure of the pumps 120 to flow through the conduit 146 and through the pressure line 154 into the outermost chamber of the hydraulic operator 56, and moving the valve member 44 to its closed position. Hydraulic fluid within the innermost chamber of the hydraulic operator 56 below the piston 54, will be allowed to flow through the pressure conduit 156 and through the conduit 148 and vent line 150 to the reservoir R. For movement of the valve 18 to its open position by remote radio control, the remote control valve 144 is moved by the solenoids S to its extreme left position, thereby reversing the pressurizing and discharging conduits. Hydraulic fluid under pressure from the manifold 142 will flow through the valve 144 to the conduit 148 and through the conduit 156 to the innermost compartment of the piston operator 56, thereby causing the piston to move outwardly and causing the valve 44 to move to its open position, as illustrated in FIGURE 2. Hydraulic fluid in the outermost compartment of the piston operator 56 will flow through conduits 154 and 146 to the vent conduit 150 and to the reservoir R.

In the position illustrated in FIGURE 3, the control valve 144 is in its center position, allowing both of the conduits 148 and 146 to be vented to the check valves 152–152' through the vent conduit 150 to the reservoir R. Fluid control check valve 152 is automatically moved by its springs S (FIGURE 4) to a position blocking both of the lines 146 and 148, thereby allowing depressurization of the control system but preventing movement of the piston operator. The check valve 152 thereby prevents undesired movement of the valve member 44 in the manner discussed hereinabove. Operation of the valve 18' would be identical to the operation of valve 18.

In view of the foregoing, it is apparent that I have produced a novel fluid control system for the operation of undersea valve structures, which is completely self-contained and requires no shore connected power source such as electricity or complicated distant hydraulic power source. The system is powered by air or compressed gas from easily replaceable and rechargeable containers to supply hydraulic power for operation of a simple fluid motor to open or close the undersea valve. The system is adapted for remote control or for manual control as desired. A system of this nature effectively eliminates the need for costly loading platforms and provides for extremely rapid installation of the loading facility. The invention, therefore, is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims. As many possible embodiments may be made of the invention without departing from the spirit or scope thereof, it is to be understood that all matters hereinabove set forth or as shown in the accompanying drawings are to be interpreted as illustrative and not in a limiting sense.

I claim:

1. Self-contained apparatus for controlling opening and closing of at least one valve having a movable valve member and a reciprocating stem connected to said valve member, said apparatus comprising a power operator having a cylinder, a piston disposed in the cylinder and dividing the cylinder into two compartments, said piston adapted to impart longitudinal movement to the stem for opening and closing the valve, a pair of pressure conduits extending one from each of said two compartments, a reservoir for storage of hydraulic fluid, fluid pump means connected to said reservoir, hydraulic supply lines interconnecting said pump means and said conduits for supplying hydraulic fluid from said pump means to said pressure conduits, compressed gas energized motor means for driving said fluid pump means, a self-contained source of compressed gas supplying compressed gas to said gas energized motor means, remotely controlled three-way valve means in said supply lines for controlling movement of hydraulic fluid from said pump to said cylinder means for energization of said piston to selectively open or close said valve means, manually controlled three-way valve means in communication with said supply lines for selectively controlling the flow of hydraulic fluid from said pump means to said cylinder means for controlling opening or closing of said valve means, manually operable pump means in said supply lines and being operable through said manually controlled three-way valve means for selectively supplying pressurized hydraulic fluid to said cylinder means for opening or closing said valve means.

2. Apparatus as set forth in claim 1, each of said three-way valve means having a first position allowing the flow of pressurized hydraulic fluid to one of said two compartments from said pump means and allowing venting of the other of said two compartments to said reservoir, a second position allowing the flow of hydraulic fluid to the other of said two compartments and allowing venting of said one of said two compartments to said reservoir and a third position preventing the flow of pressurized hydraulic fluid to either of said two compartments.

3. Apparatus as set forth in claim 2, including means responsive to the level of fluid in said reservoir for controlling the flow of gas from said gas source to said motor means.

4. Apparatus as set forth in claim 3, said means for controlling the flow of gas to said motor means comprising safety valve means in said gas supply conduit means being operative to block the flow of gas through said gas supply conduit means in the event the level of fluid in said reservoir falls below a predetermined level.

5. Apparatus for controlling opening and closing of at least one valve having a movable valve member and a reciprocating stem connected to said valve member, said apparatus comprising a power operator having a cylinder, a piston disposed in the cylinder and dividing the cylinder into two compartments, said piston adapted to impart longitudinal movement to the stem for opening and closing the valve, a pair of hydraulic conduits extending one from each of said two compartments, a reservoir for storage of hydraulic fluid, fluid pump means communicating with said reservoir, hydraulic supply lines connected to said pump means for supplying hydraulic fluid from said pump means to said hydaulic conduits, compressed gas energized motor means for driving said fluid pump means, remotely controlled three-way valve means in said supply lines for controlling movement of hydraulic fluid from said pump to said cylinder means for energization of said piston to selectively open or close said valve means, manually controlled three-way valve means in communication with said supply lines for selectively controlling the flow of hydraulic fluid from said pump means to said cylinder means for alternatively controlling opening or closing of said valve means, manually operable pump means in said supply lines and being operable through said manually controlled three-way valve means for selectively supplying pressurized hydraulic fluid to said cylinder means for opening or closing said valve means, means in said supply lines blocking the flow of hydraulic fluid from both of said two compartments upon the loss of pressure from said pump means for preventing undesired movement of said valve.

References Cited
UNITED STATES PATENTS

| | | | |
|---|---|---|---|
| 1,616,841 | 2/1927 | Beebe | 60—52 X |
| 1,829,708 | 10/1931 | Belcher | 251—130 |
| 2,797,061 | 6/1957 | Buchanan | 251—130 |
| 2,802,483 | 8/1957 | Davis | 137—553 |
| 2,938,347 | 5/1960 | Sturgis | 60—52 |
| 2,974,677 | 3/1961 | Natho | 251—26 X |
| 3,009,474 | 11/1961 | Crichten | 137—344 |
| 3,156,255 | 11/1964 | Casquet et al. | 251—26 X |

M. CARY NELSON, *Primary Examiner.*

A. ROSENTHAL, E. K. FEIN, *Assistant Examiners.*